United States Patent Office 2,756,534
Patented July 31, 1956

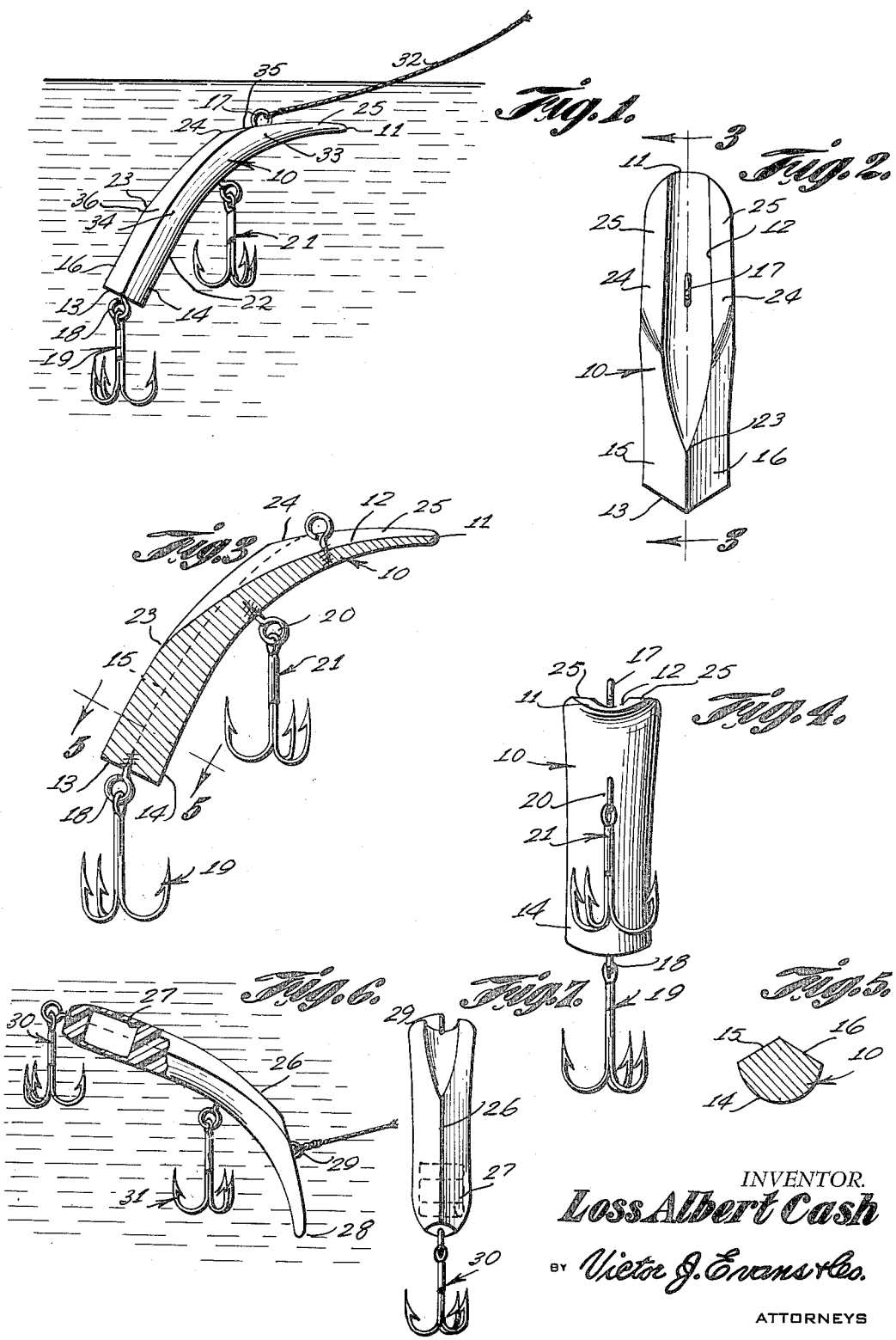

2,756,534

ARTIFICIAL FISHING LURE PLUG

Loss Albert Cash, Bonne Terre, Mo.

Application May 13, 1954, Serial No. 429,435

1 Claim. (Cl. 43—42.48)

This invention relates to a fishing lure of the type used for casting, and in particular an arcuate body which in retrieving is adapted to be suspended in the water, having a control plane area, which the moment a scoop at the nose and the tail section reach their operating positions, comes into play meeting the thrust of the water and thereby gaining the same result as if the water was flowing upwardly and controlled along a longitudinally positioned groove in the body thereby gaining improved control over the return of the lure in the water and regulating the running depth of the arcuate body.

The purpose of this invention is to provide a fishing lure which in retrieving is adapted to remain motionless on or below the surface of the water with the tail section hanging downwardly presenting hooks on the tail section whereby they are exposed to all strikes and with a scoop at the nose adapted to displace the water surface, creating commotion when the lure is twitched by a pull on the fishing line.

It seems obvious that some fish and particularly black bass barely pluck at a large lure, lightly to test the lure before taking it to see if it is edible and with a lure positioned upon the surface of the water a black bass strikes and whirls back downwardly as quickly as possible, seemingly afraid of some enemy from the air. With conventional lures it is necessary to retrieve the lure at such speed that a black bass with its limited patience does not appreciate what is passing. With these thoughts in mind this invention contemplates a lure adapted to be suspended at or close to the surface of the water and that is adapted to remain motionless at intervals in retrieving. It seems obvious that black bass strike while a lure is motionless provided they have had an opportunity to see it in motion before. And with this thought in mind this invention contemplates a lure having an arcuate body which in cross section is provided with a V-shaped upper surface and a semi-circular lower surface and which is provided with a scoop at the nose and a longitudinally disposed groove in the upper part of the trailing surface and to this body a line attaching eye and gangs of hooks are secured.

The object of this invention is, therefore, to provide means for shaping and balancing the body of a fishing lure whereby the lure is adapted to remain motionless at or near the surface of the water in retrieving.

Another object of the invention is to provide an improved fishing lure which, when held in tension by drawing on a fishing line is suspended with the tail portion downwardly whereby hooks on the tail portion are presented to fish attempting to take the lure.

A further object of the invention is to provide an improved fishing lure that is adapted to remain motionless in the water at intervals in retrieving in which the lure is of a simple and economical construction.

With these and other objects and advantages in view the invention embodies an arcuate body having a scoop at the nose with a line attaching eye positioned on the upper surface and spaced from the nose, with a longitudinally disposed groove extended from the nose to a point spaced from the trailing end positioned in the upper surface and with gangs of hooks mounted on the trailing end and positioned at a point intermediate of the ends and on the under surface of the body.

Other features and advantages of the invention will appear from the following description taken in connection with the drawing, wherein:

Figure 1 is an elevational view illustrating the position of the lure in water in retrieving.

Figure 2 is a plan view of the lure.

Figure 3 is a longitudinal section through the lure taken on line 3—3 of Fig. 2.

Figure 4 is an elevational view looking toward the nose or leading end of the lure and showing hooks extended downwardly from the body of the lure.

Figure 5 is a cross section through the trailing end of the lure being taken on line 5—5 of Fig. 3.

Figure 6 is an elevational view of the lure with parts broken away showing an air chamber or cavity in the lure and showing the lure with the nose extended downwardly.

Figure 7 is a plan view of the lure with the parts as shown in Fig. 6.

Referring now to the drawing wherein like reference characters denote corresponding parts the improved fishing lure of this invention includes a body 10 having a concave nose or scoop 11 at the forward or leading end, a longitudinally positioned groove 12 in the upper surface of the leading end and having a tail or trailing end 13, the lower portion 14 of which is substantially semi-circular in cross section and the upper portion of which is V-shaped having flat sloping surfaces 15 and 16.

The nose or leading end of the body is provided with a line attaching eye 17 and the trailing end is provided with an eye 18 to which gang hooks 19 are attached. The intermediate portion of the body is also provided with an eye 20 by which gang hooks 21 are attached to the body.

The body is formed with an arcuate under surface 22 that extends from the nose 11 to the trailing end 13 and the upper surface is patterned as illustrated in Figs. 2 and 3.

As illustrated in Figs. 2 and 3 the groove 12 extends from the nose 11 to a point 23 spaced from the trailing end 13 of the lure and the sides of the lure are provided with humps or high points 24 which provide a substantially horizontal platform, as indicated by the numeral 25 adjacent the nose.

In the design shown in Figs. 6 and 7 a lure 26, similar to the lure 10 is provided with a cavity 27 in which air or other buoyant material may be placed and it will be understood that the cavity 27 may be located at other points in the body of the lure and may be of a suitable size to balance the body of the lure. In this design the lure is provided with a nose 28, a line attaching eye 29 and gang hooks 30 and 31 may be attached thereto.

With the body of the lure shaped and with the parts assembled in this manner the release of pressure on a line 32 in retrieving the lure causes the lure to assume the position shown in Fig. 1 and by twitching the line at certain intervals of time the lure is actuated just below the surface of the water and violent action is imparted thereto as tension is applied to the line. Upon drawing the lure the pressure intensity strikes the upper surface in the longitudinal groove at the point 33 and is directed vertically upward through the control groove to a point 34 where, due to the obtuse angular shape of the tail section it is directed outwardly along lines from the eye 17 to the opposite corners of the nose.

By releasing the line the lure remains substantially stationary and is suspended on or below the surface of the water, the depth of the lure in the water being dependent upon the size or weight of the hooks or other weights mounted thereon. By this means the depth of the lure in the water is controlled and the lure will travel in a plane parallel to the surface of the water in retrieving. The lure is weighted to sink slowly to the desired depth, and it will neither dive down deeper or come up to a shallower level in retrieving.

The lure is, therefore, weighted to sink to whatever depth fish are striking and may be retrieved at this level with the lure having violent action as soon as retrieving is started.

As the pressure intensity is traced along lines extended laterally from the point 33 or eye 17 it reaches the end of the tail section imparting a downward tipping motion to the sides of the body which, when tipped beyond the center of the body causes the lateral edges to follow the path of least resistance which imparts an upward concave oscillation on the center of an arc described by the trailing end of the body to maximum limits of deviation.

The convex under side of the lure extending from the point 35 to the point 36 on the body of the lure provides a fulcrum upon which a seductive action of the lure pivots.

It will be understood that other modifications, within the scope of the appended claim, may be made in the design and arrangement of the parts without departing from the spirit of the invention.

What is claimed is:

In a fishing lure, the combination which comprises an arcuate body having a nose on the leading end and having an enlarged blunt ended section on the trailing end, the forward portion of said body and said nose being provided with an upper surface, that is concave at its longitudinal center and is provided with substantially flat surfaces at opposite sides of the concavity and the lower portion of said trailing end being semi-circular and the upper surface being triangularly shaped with downwardly and outwardly sloping sides, the concavity in the upper portion of said body and nose having a longitudinally disposed bullet shaped configuration extended from the nose with the point thereof terminating at a point spaced from the tail, an eye positioned in the longitudinally disposed concavity and spaced from the nose of the body, and gangs of hooks depending from the trailing end of the body and also from a point intermediate of the length of the body.

References Cited in the file of this patent

UNITED STATES PATENTS

| | | |
|---|---|---|
| 1,455,624 | Koch | May 15, 1924 |
| 1,752,706 | Sobecki | Apr. 1, 1930 |
| 2,133,032 | Martz | Oct. 11, 1938 |
| 2,270,488 | Withey | Jan. 20, 1942 |
| 2,506,263 | Bessinger | May 2, 1950 |
| 2,542,429 | Perry | Feb. 20, 1951 |
| 2,613,471 | Traycik | Oct. 14, 1952 |
| 2,621,438 | Helin | Dec. 16, 1952 |
| 2,641,862 | Poe | June 16, 1953 |
| 2,684,551 | Hall | July 27, 1954 |